United States Patent [19]

Hooper et al.

[11] Patent Number: 5,493,638

[45] Date of Patent: Feb. 20, 1996

[54] REMOTE DISPLAY OF AN IMAGE BY TRANSMITTING COMPRESSED VIDEO FRAMES REPRESENTING BACK-GROUND AND OVERLAY PORTIONS THEREOF

[75] Inventors: Donald F. Hooper, Shrewsbury; David M. Tongel, Worcester, both of Mass.

[73] Assignee: Digital Equipment Corporation, Maynard, Mass.

[21] Appl. No.: 322,662

[22] Filed: Oct. 13, 1994

Related U.S. Application Data

[62] Division of Ser. No. 172,442, Dec. 22, 1993, Pat. No. 5,422,674.

[51] Int. Cl.$^6$ ................................................. G06F 15/00
[52] U.S. Cl. .................................................... 395/135
[58] Field of Search ................................. 395/135, 133; 345/113, 114; 348/584, 588, 598

[56] References Cited

U.S. PATENT DOCUMENTS

| | | | |
|---|---|---|---|
| 4,811,084 | 3/1989 | Belmares-Sarabia | 358/22 |
| 4,829,372 | 5/1989 | McCalley | 358/86 |
| 5,014,125 | 5/1991 | Pocock | 358/86 |
| 5,130,792 | 7/1992 | Tindell | 358/85 |
| 5,132,992 | 7/1992 | Yurt | 375/122 |
| 5,133,079 | 7/1992 | Ballantyne | 455/4.1 |
| 5,253,341 | 10/1993 | Rozmanith | 395/200 |
| 5,262,856 | 11/1993 | Lippman | 358/136 |
| 5,321,750 | 6/1994 | Nadan | 380/20 |
| 5,325,423 | 6/1994 | Lewis | 379/90 |
| 5,329,365 | 7/1994 | Uz | 348/469 |

Primary Examiner—Phu K. Nguyen
Attorney, Agent, or Firm—James F. Thompson; Ronald C. Hudgens

[57] ABSTRACT

An interactive video system employs Motion Picture Expert Group (MPEG) video compression to transfer images from a remote server to a television. The images correspond to dialog frames in a graphical user interface. During an authoring process, the dialog frames are created by first creating a background image and then adding foreground elements, such as buttons. A set of MPEG video frames is created by encoding the resulting images according to the MPEG algorithm. The MPEG video frames are delivered to the television in sequence, where an MPEG decoder uses them to reconstruct the dialog images that are subsequently displayed. The system also contains an object-oriented database that maintains the necessary MPEG file ordering and also carries out menu navigation commands received from the user. The object classes include NODE, BRANCH, and DISPLAY. NODE objects correspond to dialog frames, and BRANCH objects correspond to user-selectable features such as buttons. DISPLAY objects correspond to either complete or partial images, as described in corresponding MPEG files. Data and function elements within the objects allow the system to track the user's navigation commands, and to highlight and unhighlight selectable features as navigation proceeds in order to provide visual feedback to the user.

22 Claims, 6 Drawing Sheets

IMAGE1

IMAGE2

IMAGE3

REMOTE DISPLAY OF AN IMAGE BY TRANSMITTING COMPRESSED VIDEO FRAMES REPRESENTING BACK-GROUND AND OVERLAY PORTIONS THEREOF

This is a divisional of application Ser. No. 08/172,442, filed on Dec. 22, 1993, International Application filed on and which designated the U.S., now U.S. Pat. No. 5,422,674.

FIELD OF THE INVENTION

The invention relates generally to the fields of video graphics and video transmission, and more particularly to interactive video systems such as modern video on demand systems.

BACKGROUND OF THE INVENTION

Information service to the home is a new field, enabled by the availability of storage and transmission technologies that can store and deliver data such as video and images at an affordable cost. One example of such a new service is video on demand, wherein a subscriber interacts with a remote video service to request the presentation of a particular movie or other video program on the subscriber's television. This interaction may be via a telephone or may be via the same settop terminal and cable that are used to bring cable television programming to the television.

One technology that contributes to improved home information service is video compression technology. Using video compression, a motion-picture video can be sent over a communications channel using only a fraction of the bandwidth of a conventional television channel. As a result, many more video channels can be carried over a given medium, such as modern television cable media, so that it is now possible to have private or semi-private video channels entering the home, in a manner similar to a home's telephone service.

One known technique for video compression is referred to as the Motion Picture Industry Group (MPEG) compression algorithm. In this algorithm, each frame of a motion-picture video is described either independently or as a change from a previously-displayed frame. Thus a video scene might be described by a single independent frame which shows the entire scene as it initially appears, followed by a long series of change frames which describe the changes in the scene as actors move, for example. Using such a technique, considerable channel bandwidth can be saved by eliminating the redundant transmission of unchanging elements of the scene.

The MPEG algorithm and similar algorithms are already in use in video information services. The MPEG algorithm is described in the following specifications: ISO/IEC 11172, Nov. 1991 (MPEG 1); and ISO/IEC WG11 N0501, July 1993 (MPEG 2). Both of these specifications are incorporated herein by reference. Also, C-Cube Inc. sells MPEG decoder chips having part nos. CL450 and CL950.

While video compression is thus enabling the creation of a new video transmission network, other techniques are being used to enable greater subscriber interaction with the video service. One method for enabling such interaction via the cable television system is to employ a series of graphical menus that are displayed on the TV screen. The subscriber interacts with these menus in a fashion similar to a computer user's interaction with so-called graphical user interfaces, which employ windows, dialog boxes, buttons, pull-down menus, and other features to present information and options to the user. The remote video service is responsible for controlling the display of these items on the screen, and for receiving and interpreting subscriber input to ascertain the subscriber's request.

Graphical user interfaces are particularly common on personal computers (PCs) and workstations, which generally have in them all of the graphic software and/or hardware required to perform the drawing tasks required by the interface. In contrast, graphical user interfaces are not as widely used for home information services. Such interfaces require both a considerable amount of storage, for graphical libraries, drawing software, etc., and also high information bandwidth between the graphics hardware and the display. These features are readily available in a PC without unduly increasing its overall cost. However, the addition of graphics software and/or hardware to a relatively inexpensive settop greatly increases its cost. For this reason, graphics hardware and software either are not provided in settops, or, when they are, have only limited functionality in order to minimize cost.

In the cable TV industry, dedicated channels presently deliver program guide background to the settop, and relevant text is then overlaid on the background to display program guides with some graphics, such as lines and colors. It is known to use graphical enhancement integrated circuits in the settop to provide shadows and other visual enhancements to the displayed image. However, this method is limited in that there is only one background, and the analog nature of the signal used to convey the background limits the amount of detail that can be sent to the settop. Furthermore, this method only permits text overlays, and therefore cannot produce a robust graphical user interface of the type referred to above.

SUMMARY OF THE INVENTION

In light of the limitations of present-day interactive video systems, it is an object of the present invention to enable the display of a robust graphical user interface in an interactive video system. It is a further object to enable the display of high quality graphics in connection with the graphical user interface, so that detailed and user-friendly menus can be displayed for easy use by a TV subscriber. It is also an object to provide such capability at a low cost, so that the resulting interactive system can enjoy wide use in the commercial video entertainment industry.

In keeping with the above-mentioned objectives the present invention is in one aspect a method for displaying images from a remote location without the necessity of storing images or drawing software on the settop. Rather, the images are stored at the remote video service location and transmitted therefrom in a compressed format. A video decoder already used in the settop for receiving motion picture videos, such as the above-mentioned MPEG decoder, is also used to reconstruct the still images, such as menus, employed in the graphical user interface.

In particular, this aspect of the invention includes the method steps of (i) creating a background image to serve as the background in the still image; (ii) adding foreground elements to the background image to compose the still image; (iii) encoding the background and still images according to a compression algorithm that is capable of describing a single image by an independent video frame and also capable of describing the differences between a pair of images by a change video frame, the result of the encoding step being a compressed independent video frame independently describing the background image and a sequence of at least one compressed change video frames describing the differences between the background image ant the still image; (iv) storing the compressed video frames on a computer coupled to the communications medium in a manner sufficient to preserve the sequentiality of the compressed change video frames; (v) retrieving the stored compressed video frames in preparation for their subsequent transmission on the communications medium; and (vi) sequentially transmitting the retrieved compressed independent video frame and the retrieved compressed change video frames on the communications medium, each retrieved frame being transmitted in a corresponding packet having a header that enables the subsequent identification of that packet by a video display device coupled to the communications medium upon which the still image is to be displayed.

By employing compressed video frames, in particular compressed independent frames and change frames, high-quality graphics can be achieved using a reasonable amount of signal bandwidth. Therefore many subscriber interactions can take place simultaneously without sacrificing an undue number of video channels in the broadcast video system. Furthermore, the cost of the additional settop hardware required to process these frames is significantly less than the cost of a full-blown graphics processor. Therefore the graphics capability of the settop has been significantly improved without a commensurate increase in its cost, especially since the same video decoding hardware serves "double duty" to achieve a major part of the present invention's functionality.

In another aspect, the invention is a method of carrying out navigation in a graphical user interface by employing independent and change video frames. This aspect includes the steps of (i) instantiating application programs each being associated with a corresponding one of control objects appearing on a dialog video image to be subsequently displayed on a display device coupled to a communications medium connected to the computer; (ii) transmitting over the communications medium a sequence of at least one compressed video frame collectively representing an unhighlighted version of the dialog video image, the transmitted video frames being encoded according to a compression algorithm that is capable of describing a single image by an independent video frame and also capable of describing the differences between a pair of images by a change video frame; (iii) transmitting over the communications medium a change video frame representing changes to be made to the unhighlighted dialog video image in order to highlight an initial one of the control objects appearing thereon; (iv) awaiting the receipt of a keystroke identifier from the communications medium; (v) executing the following navigation steps if the received keystroke identifier represents one of a set of navigation commands to be carried out by the computer:

(i) transmitting over the communications medium a change frame representing changes to the displayed dialog image that are necessary to unhighlight the control object that is currently highlighted;

(ii) selecting another of the control objects for highlighting as directed by the one navigation command; and (iii) transmitting over the communications medium a change frame representing changes to the dialog image that are necessary to highlight the selected control object; and (vi) invoking the application program associated with the currently-highlighted control object if the keystroke identifier represents a select command to be carried out by the computer.

This aspect of the invention takes advantage of video compression to carry out robust navigation in a graphical user interface while conserving video bandwidth on the communication channel, thus enabling its use with numerous subscribers over a shared physical channel.

And in another aspect, the invention is a method of carrying out navigation in a graphical user interface by use of a particular type of object-oriented database. The database objects are (1) a node object corresponding to a dialog video image; (2) branch objects each corresponding to a particular control object appearing on the node object; and (3) display objects each corresponding to one of the many discrete images that must be employed in the graphical interface. For example, a branch object can correspond to a "button" whose appearance changes when it is selected. One display object can be used to display the image having the button not selected, and another for the image having the button selected. The node, branch, and display objects have a variety of data and function elements to enable them to carry out initialization, display, and navigational steps, and also to invoke application programs associated with some dialog control objects.

BRIEF DESCRIPTION OF THE DRAWINGS

An embodiment of the invention will be described with reference to the accompanying drawings, in which.

DETAILED DESCRIPTION

Figure 1:
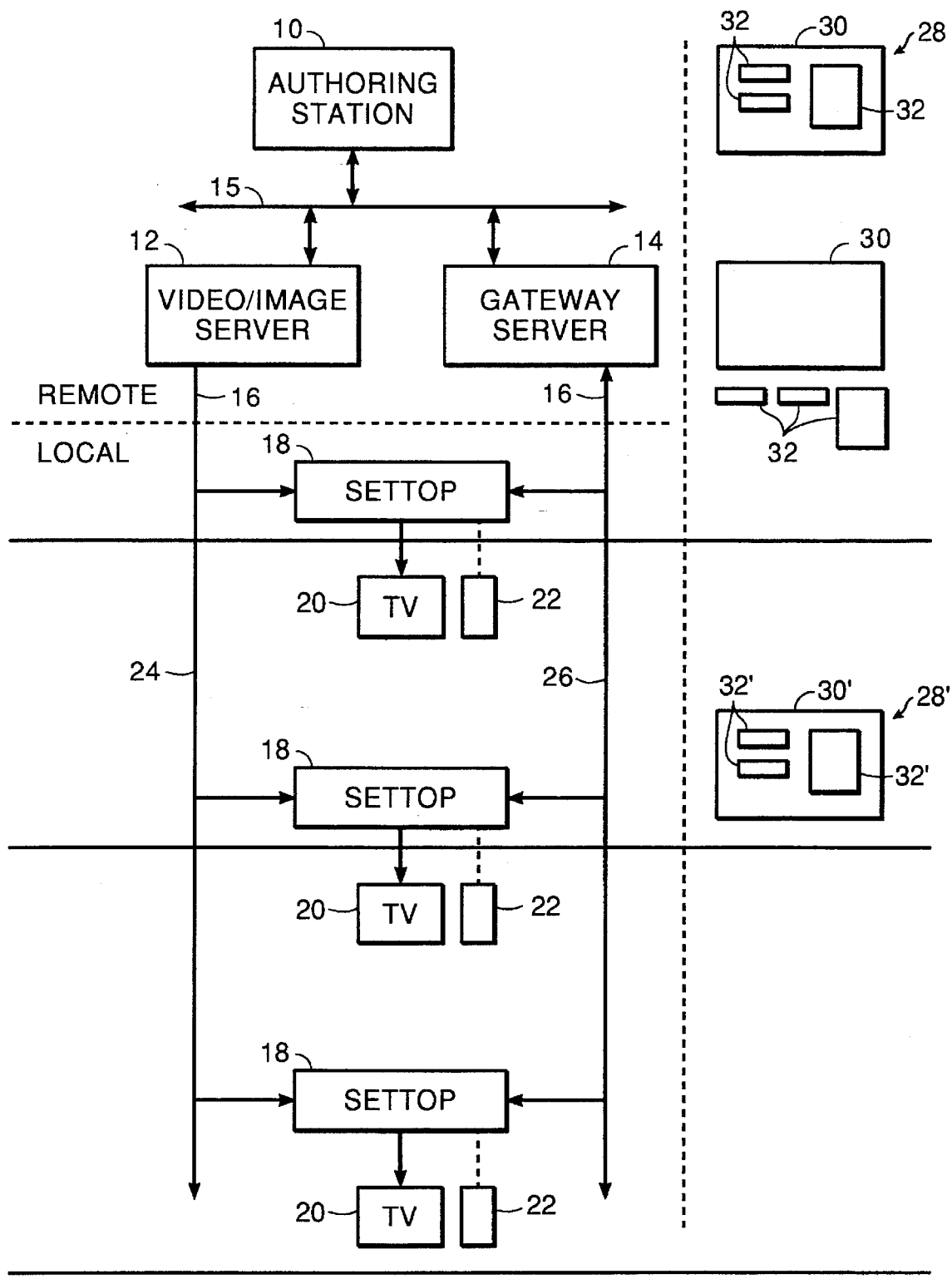
FIG. 1 is a block diagram of an interactive video system embodying the principles of the present invention.

In FIG. 1, an authoring station 10, video/image server 12 and gateway server 14 are coupled together via a communications link 15 such as Ethernet. The servers are at a "remote" location, such as a cable television transmission facility. The servers 12 and 14 are connected via one or more communications media 16 to settops 18 in subscribers' homes, each settop 18 being in turn connected to a corresponding TV 20. There is also a remote controller 22 associated with each TV 20. Appearing on the communications media 16 are two independent data streams: a unidirectional video data stream 24 being broadcast from the video server 12 to the settops 18, and a bidirectional control data stream 26 carrying control messages between the gateway server 14 and the settops 18. It may be that the communications medium 16 is a single medium such as a conventional television cable; in such a case, the two data streams 24 and 26 are multiplexed thereon in any of several known fashions. In alternative embodiments, the data streams 24 and 26 may be carried on separate physical media, or may intermittently exist on the same media, such as in the case of a packet-switched network. While the particular mode of transmission is not germane to the present invention except as hereinbelow described, it should be noted that the U.S. Federal Communications Commission has recently allocated a band of frequencies in the range of 500–800 MHz for digital television transmission. It is anticipated that the present invention will find application in cable broadcast systems employing this newly-allocated frequency band.

The partition of the server function into video/image 12 and gateway 14, as shown in FIG. 1, has the advantage that each server workstation can be independently optimized for maximum performance. For example, the video/image server 12 has high storage capacity, and must deliver data to a unidirectional channel at very high bandwidths. The gateway server 14, in contrast, carries out bidirectional communications and other functions. While it is possible, and indeed less expensive, to carry out both functions in a single workstation, the available video bandwidth in such an embodiment would be less than that of the illustrated configuration, due to interference between the video and communications activities. Therefore a partition of the type shown is preferred in the near term.

At the authoring station 10, which may for example be a conventional graphics workstation, a dialog image 28 is created by a process described in greater detail below with reference to FIG. 2. The dialog image 28 is part of a graphical interface employed in the video system to enable a subscriber to interact therewith. For example, it may be a conventional menu showing lists of available command options, such as commands for requesting the presentation of a movie, etc. The dialog image 28 consists of a background image 30 and one or more overlay images 32. An example of an overlay image is a conventional dialog box which displays a short message to the subscriber on a small portion of the screen; another example is a conventional control "button" that is used to initiate a particular action associated therewith. The dialog image 28 also typically has blocks of text, not shown in FIG. 1, appearing on the background image 30 and/or the overlay images 32. A more realistic image is described below with reference to FIGS. 5 through 7.

The overlay images 32 occlude the portions of the background image 30 where they are placed, and may in fact occlude other overlay images in whole or in part. An example of such a case is a conventional "pop-up" menu, which when it appears occludes a previously-displayed overlay image. The overall dialog image 28, then, can be thought of as being created from a particular sequence of everlay images 32 placed on top of the background image 30. This layered nature of the dialog image in particular is advantageously exploited in the present invention. However, the principles of the invention are generally applicable to any still image which can be decomposed into a background image and a sequence of overlay images.

As will be described in greater detail below with reference to FIG. 3, the components shown in FIG. 1 cooperate to transmit the dialog image 28 to the TV 20 for display. In particular, data representing the individual images 30, 32 are transmitted to the settops 18, where a reconstruction process is carried out that results in the display of a reconstructed dialog image 28' made up of a reconstructed background image 30' and reconstructed overlay images 32'. Any text appearing on the image is also reconstructed and displayed.

The settop 18 performs the conventional function of receiving video frames from the video data stream 24 and converting them into an analog TV signal, such as an NTSC signal, suitable for direct use by the TV 20. The settop 18 must of course contain de-compression circuitry that is compatible with the compression technique being used in the system. In the case of an MPEG type of video data stream, the settop 18 includes an MPEG decoder chip of the type mentioned above, and additional conventional circuitry to receive MPEG video frames and provide them to the decoder, as well as a conventional frame buffer and associated circuitry for translating its contents to the TV-compatible analog signal. The settop 18 also receives a signal from the remote 22 whenever a key is pressed, and transmits a message on the control data stream 26 that identifies the keystroke.

Figure 2:
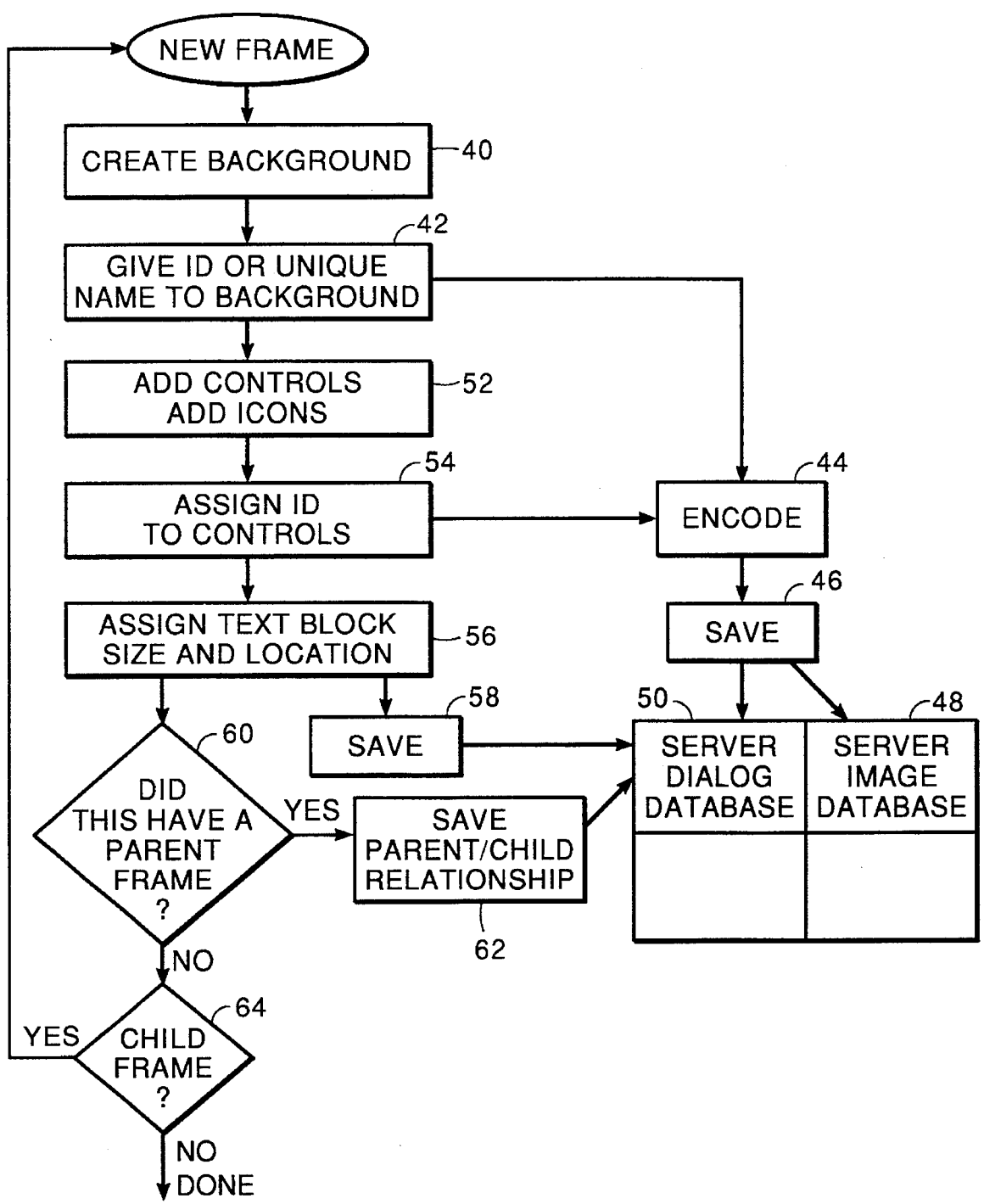
FIG. 2 is a flow diagram showing how video frames and their identifying information are created and stored in video server components of the system of FIG. 1.

Referring now to FIG. 2, the procedure followed at the authoring station 10 is described. For each frame to be created, where "frame" refers to a complete still image to be displayed, the background image 30 of FIG. 1 is created at step 40. This image, as with all the images created in FIG. 2, can be created using a conventional drawing program that outputs a bitmap representation of the image. Examples of such drawing programs are Corel Draw from Corel, Inc.; Windows SDK from Microsoft, Inc.; and MediaClips from Aris Entertainment Co. Microsoft Viewer may also be used to convert image files from one format to another if necessary. The background image 30 may also be captured from a photograph, paused video, or other graphical source using conventional image capturing hardware and/or software, such as a scanner.

Once the background image 30 is created, a unique ID or name is given to it at step 42. The bitmap representation of the background image 30 is then encoded in step 44. The encoding is carried out according to the aforementioned MPEG algorithm by providing the image files to MPEG encoding software also installed on the system. This encoding software may be obtained from a company called Portable Video Research Group in California. The MPEG algorithm is capable of describing an image by either a single independent video frame, called an I-frame, or by a combination of an initial I-frame and one or more succeeding change frames, called P-frames, each of which describes a change to a previously-displayed image. Typically, the P-frame data is written into a frame buffer whose contents are already being displayed, resulting in a modification to the displayed image.

The result of encoding the background image in step 44 is the creation of a compressed I-frame that independently describes the background image 30. This background I-frame is then saved, at step 46, in an image database 48 in the video/image server 12 of FIG. 1, and the ID corresponding to the background I-frame is saved in a dialog database 50 in the gateway server 14.

After the above-described steps have been carried out for the background image 30, various overlay images are created in step 52. These may be dialog boxes, buttons, and/or icons as mentioned above. The result of this step is a nearly complete dialog image 28, missing only any necessary text. The overlay images are assigned IDs in step 54, and then fed to the MPEG encoder in step 44. The result of this encoding is a set of compressed P-frames, each describing a corresponding one of the overlay images 32.

In step 46, the compressed P-frames and their associated IDs are also saved in the video/image server 12 and gateway server 14. The P-frames and I-frame are saved as an ordered list, so that they may be transmitted in the proper sequence to ensure correct reconstruction of the image. This list can take the form, for example, of a conventional linked list data structure.

At step 56, text is assigned to locations on the frame. The text is given several attributes, such as size, location, font, etc. This information is also saved, at step 58, in the dialog database 50. In the absence of any parent/child frame relationships, described below, the description of the dialog frame 28 is then complete and ready for subsequent transmission and display.

If invoking a control or button on one frame is intended to cause another dialog frame to appear, then both of these frames must be created and logically linked together. In such a case, the first frame is referred to as the "parent", and the second as the "child". Upon completion of a parent frame at step 58, the process takes the "yes" branch at step 64 and repeats the foregoing steps to create the child frame. Upon completion of the child frame, the process takes the "yes" branch at step 60, a linkage is saved at step 62 to establish the parent/child relationship, and then the process is complete. An example of how such a parent/child linkage is created is given below with reference to FIG. 8. At the completion of the process of FIG. 2, then, all of the necessary MPEG frames, text, and control information necessary to describe the dialog image 28 has been created and stored on the servers 12 and 14 of FIG. 1 for subsequent transmission to the settops 18 for reconstruction.

Figure 3:
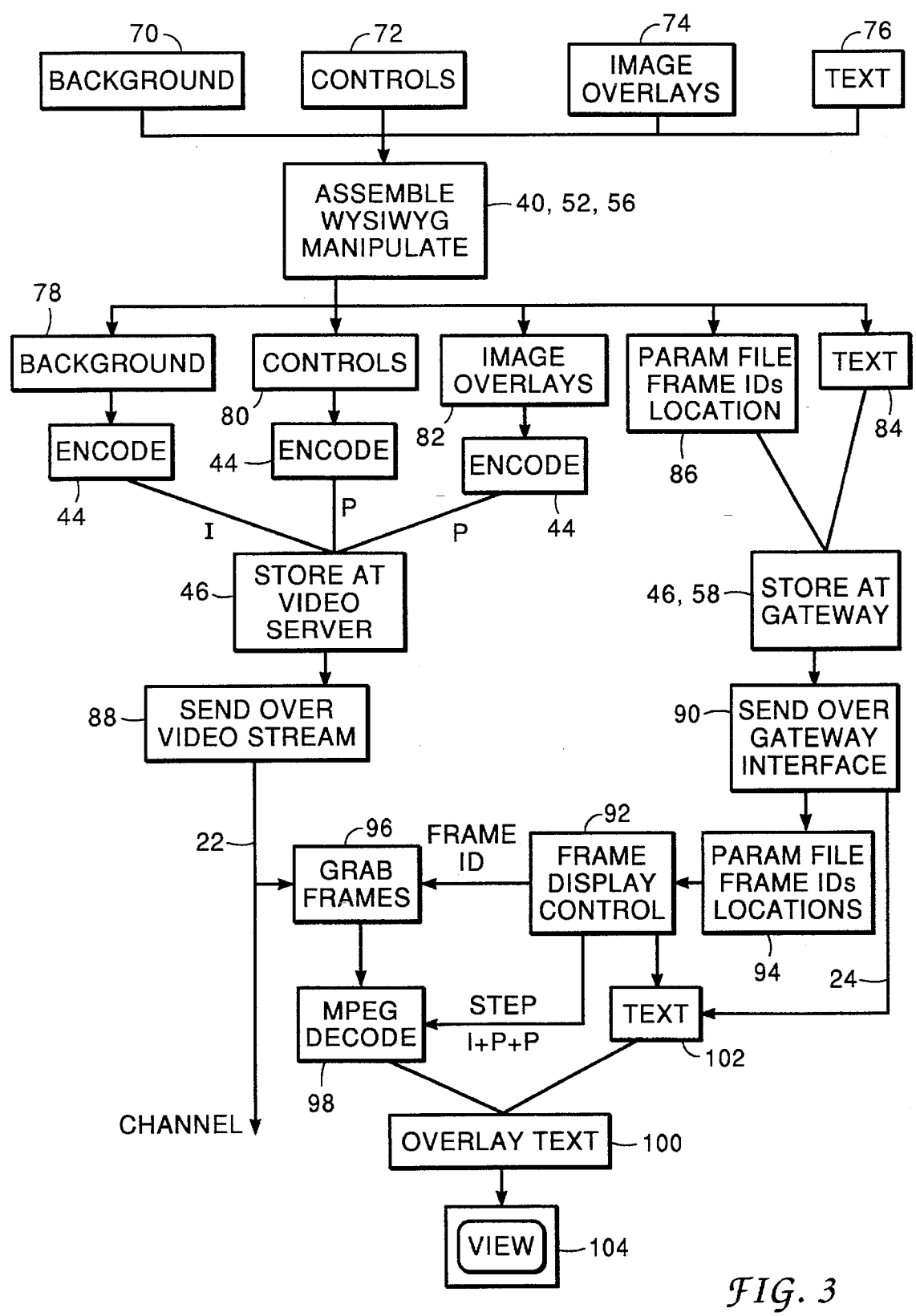
FIG. 3 is a flow diagram showing the overall operation of the system of FIG. 1, including that of a TV settop shown therein.

FIG. 3 shows the overall operation of the system of FIG. 1 in a dataflow format. Initially, objects such as background objects 70, control objects 72, image overlay objects 74, and text objects 76 are picked and assembled into the dialog image 28 by the image creation steps 40, 52, and 56 of FIG. 2. These objects may be stored in a graphics library on the authoring station 10, for example. This authoring process results in final versions of the background image 78, the controls 80, the other image overlays 82, and text 84. Additionally, control information is created and placed in a parameter file or in-memory array 86, which contains the frame IDs and attributes for the text objects 84.

The various final images are then encoded in step 44, and stored at the video server 12 at step 46. Similarly, the parameter file 86 and text 84 are stored at the gateway server at steps 46 and 58. These stored data are then transmitted over separate data streams to the settop 18. The P-frames and I-frames stored on the video server 12 are sent via the video data stream 24, while the text and control information stored on the gateway server 14 are sent via the control data stream 26, which is referred to in FIG. 3 as a "gateway interface" 90.

At the settop 18, a frame display controller 92 reads the received parameter file 94 to obtain the frame IDs of the images being sent in the video data stream 22 . At step 96, the frame controller grabs each frame in the video data stream 24 that matches one of the IDs in the parameter file 86, and feeds it to the MPEG decoder 98. At step 100, the reconstructed images from the decoder 98 are merged with the received text 102 to create the final reconstructed image 28', which is then displayed at 104.

What has so far been described is a display technique that relies on the use of unique IDs associated with the video frames to enable the settop 18 to grab them as they arrive. It should be noted, however, that alternative embodiments may not require such IDs. In an MPEG video stream, for example, each video packet has an embedded "hardware ID" that identifies the settop 18 for which the packet is destined. In systems using such a transmission format, separate IDs can be dispensed with, because the settop 18 simply grabs every frame containing its hardware ID.

Figure 4:
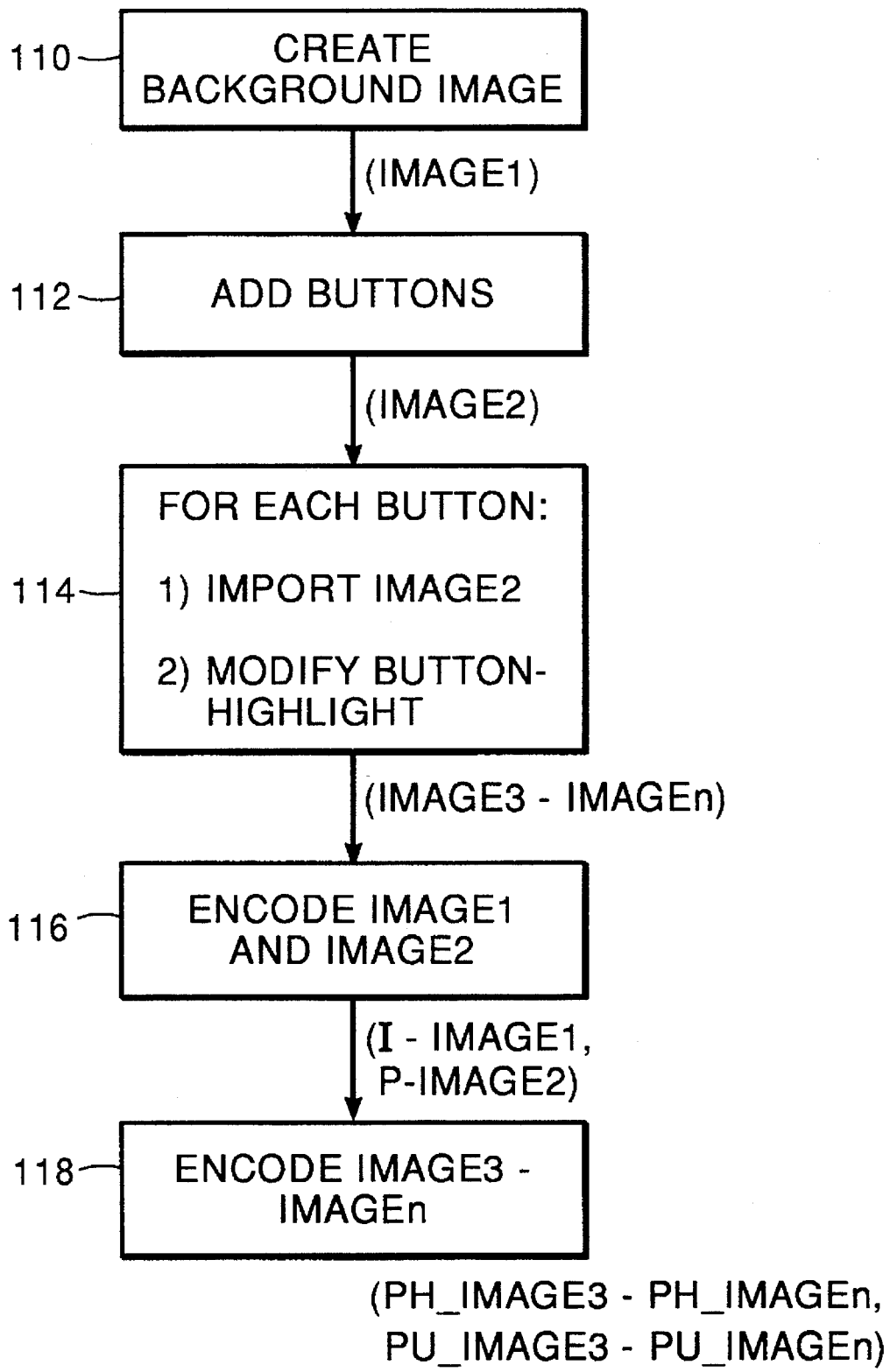
FIG. 4 is a flow diagram showing a method of creating a set of image files for a menu type of video frame having control buttons to be highlighted and unhighlighted as a user navigates around the menu.
Figure 5:
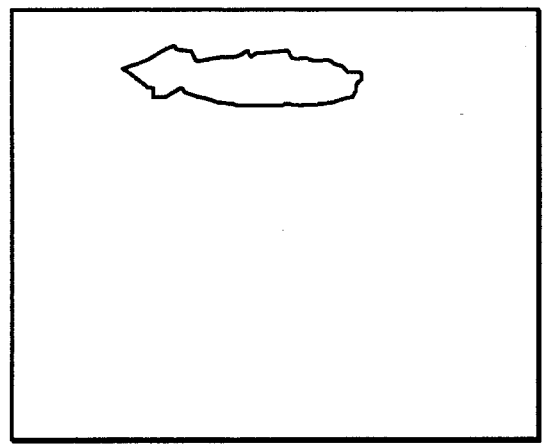
FIG. 5 shows a background image created by the method of FIG. 4.
Figure 6:
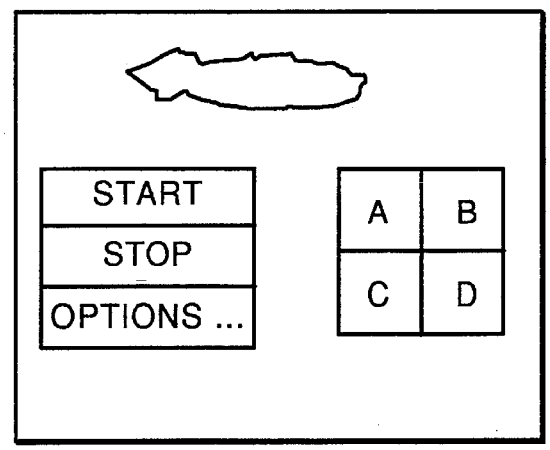
FIG. 6 shows a complete, unhighlighted dialog image consisting of the image of FIG. 5 with additional buttons overlaid thereon.
Figure 7:
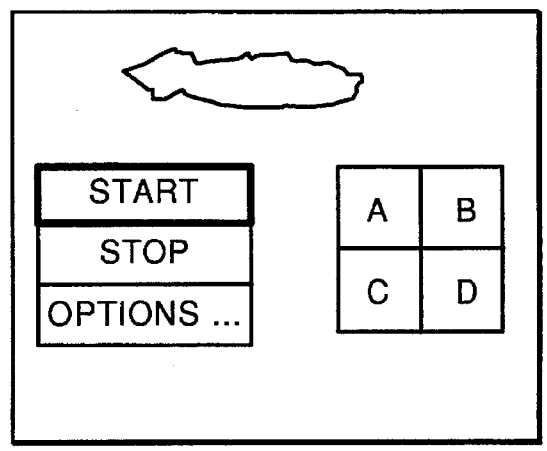
FIG. 7 shows the dialog image of FIG. 6 with one button highlighted to indicate that it is the currently active button.
Figure 8:
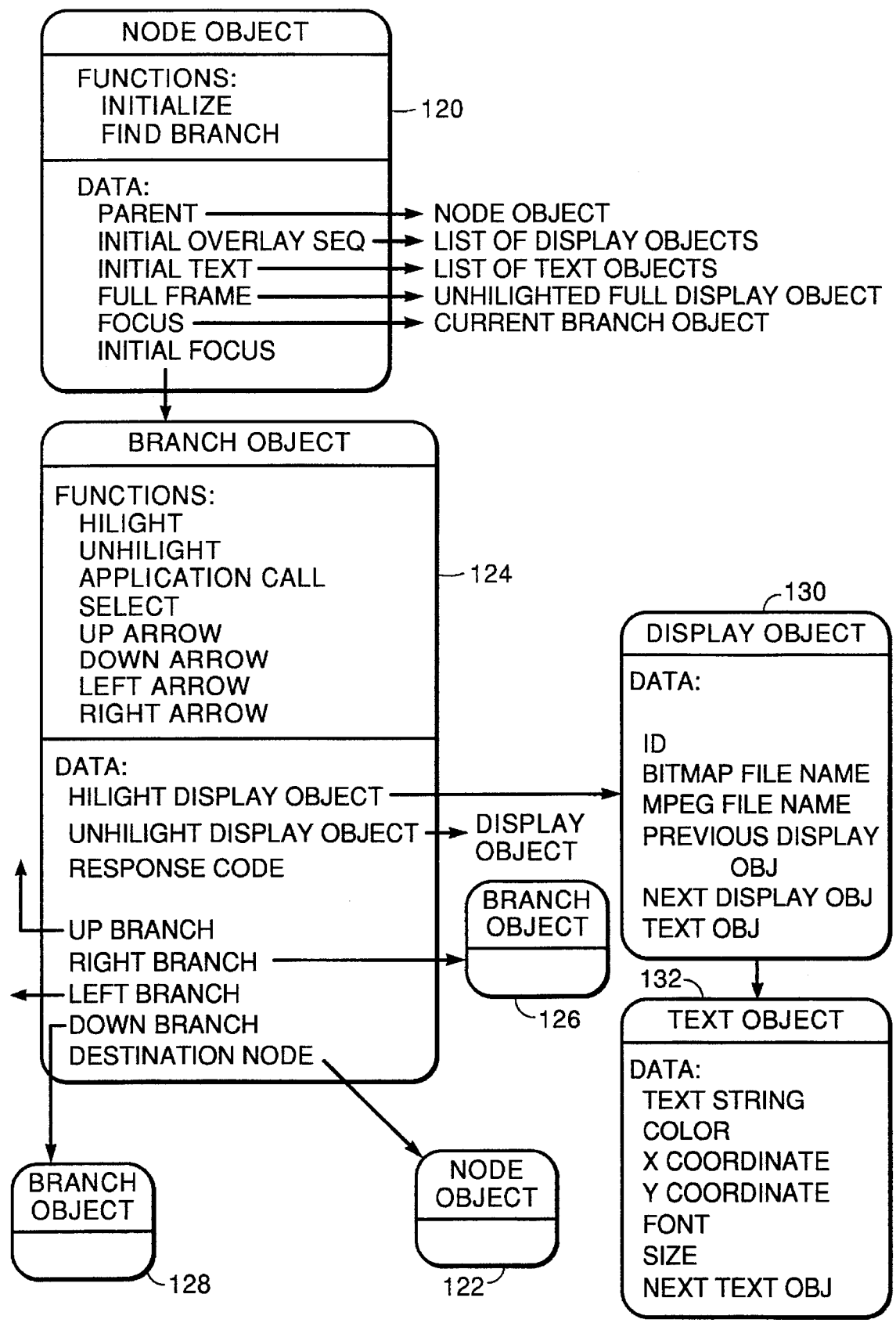
FIG. 8 is a diagram of an object-oriented implementation of a dialog database in a server within the system of FIG. 1.

While the overall system environment and general operation of an embodiment of the present invention have been described with reference to FIGS. 1 through 3, the remaining figures show an exemplary use of the system, as well as a particular implementation of the server dialog database 50 of FIG. 2. FIG. 4 shows a method of creating a particular set of images for a menu video frame, and FIGS. 5 through 7 show some of the resulting images. The files representing these images are saved in the server image database 48 of FIG. 2. FIG. 8 shows the above-mentioned implementation of the server dialog database 50.

Referring now to FIGS. 4 through 7, a background image is created in step 110. The resulting image, resembling a blimp flying at the top of the screen, is shown in FIG. 5. This image is saved as a bitmap or other graphics file named IMAGE1. At step 112, a button is added or overlaid on the background image; the resulting image is shown in FIG. 6. This image is saved and called IMAGE2. At this point IMAGE2 represents the complete, unhighlighted menu frame. While in this simple example only one overlay was used in creating the final image, more complicated images may of course employ more overlays as needed; in such a case, additional image files each representing successively-more-complete images are created.

The button labelled "OPTIONS . . . " in FIG. 6 is intended to cause another menu screen to appear when pressed. This is an example of parent/child frames as discussed above.

In step 114, a set of additional image files is created, each describing an image showing a corresponding button highlighted. This is achieved by importing IMAGE2 into the drawing tool, adding the highlighting effect to the desired button, and then saving the resulting image. An example is shown in FIG. 7, in which the button labelled "START" is highlighted. This step results in the creation of image files IMAGE3 through IMAGEn, where n-2 is the number of buttons.

While in FIG. 7 highlighting is shown as enhancement of the outline of a button, it may be achieved in other ways. For example, the object to be highlighted could instead have its colors changed, or be displayed in inverse-video. These and other suitable highlighting techniques are known in the art.

At this point, the complete set of images necessary to display and navigate the menu is complete. At steps 116 and 118, these image files are encoded according to the above-mentioned MPEG compression algorithm for later transmission. In step 116, an MPEG I-frame I_IMAGE1 is created from IMAGE1, and an MPEG P-frame P_IMAGE2 is created from the sequence (IMAGE1, IMAGE2). In step 118, additional P-frames are created to allow highlighting and unhighlighting of each button. For each pair of files (IMAGE2, IMAGEi), 2 P-frames are created: PH_IMAGEi describes going from unhighlighted to highlighted, and PU_IMAGEi describes going from highlighted to unhighlighted. This step results in the creation of image files PH_IMAGE3–PH_IMAGEn and PU_IMAGE3–PU_IMAGEn. As stated above, all of these files are saved in the server image database 48 for subsequent use.

FIG. 8 describes an object-oriented implementation of the server dialog database 50 of FIG. 2, and its operation upon images such as that of FIG. 6. Four object classes are defined, namely NODE, BRANCH, DISPLAY, AND TEXT. In FIG. 8, objects 120 and 122 are of the NODE class; objects 124, 126, and 128 are of the BRANCH class; object 130 is of the DISPLAY class; and object 132 is of the TEXT class. Each object of a given class encapsulates the data and functions shown in an exemplary instance in FIG. 8. For example, NODE objects 120 and 122 each have a function INITIALIZATION as well as data elements PARENT, INITIAL OVERLAY SEQUENCE, INITIAL TEXT, FULL FRAME, FOCUS, AND INITIAL FOCUS. The use of these various functions and data elements is described below.

The function of the database of FIG. 8 may be generally understood as follows. Each NODE object 120, 122 describes a dialog screen or frame principally by pointing to associated DISPLAY objects. The screen contains buttons or other features that enable navigation around the dialog menu; FIG. 6 shows an example of such a screen. Each of these navigation features, or buttons, is described by a corresponding BRANCH object, such as BRANCH object 122. The BRANCH objects follow the navigation commands of the user and provide visual feedback by highlighting and unhighlighting display features as navigation progresses. BRANCH objects also may invoke other NODE objects, for example to implement a nested menu. This relationship exists between BRANCH object 124 and NODE object 122, for example. DISPLAY objects contain the names of graphics files to be displayed, pointers to TEXT objects, and pointers to other DISPLAY objects to implement the MPEG overlay scheme. Finally, TEXT objects contain data describing associated text.

NODE objects either contain or refer to all of the information that is needed to create and navigate a full dialog or menu frame. One NODE object is created for each full menu display. Also, two or more NODE objects may be linked together in the above-described parent/child relationship to create more complicated menu patterns.

The data and functions of NODE objects are shown in NODE object 120 and are as follows:

PARENT is a pointer to the NODE object through which the current NODE object was accessed. For example, NODE object 122 is a child of NODE object 120, and so its PARENT element contains the ID of the parent NODE object 120.

INITIAL OVERLAY SEQUENCE is a pointer to the ordered set of MPEG I and P frames that comprise the initial unhighlighted menu display. An example is the above-mentioned set of files I_IMAGE1 and P_IMAGE2. INITIAL OVERLAY SEQUENCE points to the first of a linked list of DISPLAY objects referring to these frames, such as the DISPLAY object pointing to the file I_IMAGE1. A list is readily created by using NEXT DISPLAY OBJECT to point to the next DISPLAY OBJECT in the list. Alternatively, INITIAL OVERLAY SEQUENCE may point to a separate LIST object, not shown in FIG. 5, that contains an ordered list of pointers to those DISPLAY objects. While use of a general-purpose LIST object entails more overhead, it also enables the creation of other list types that may be useful for other operational aspects of the database.

INITIAL TEXT points to an initial one of an ordered list of TEXT objects appearing on the unhighlighted menu display.

FULL FRAME points to a single DISPLAY object that refers to the MPEG I-free that describes the full unhighlighted display. In the example of FIGS. 5 through 7, this is IMAGE2.

FOCUS keeps track of which one of several BRANCH objects is active at a given time, and INITIAL FOCUS is the first BRANCH object to be highlighted when the NODE object is first activated.

The above-described NODE data elements are used by the NODE's INITIALIZE function to bring the display to an initial state. The INITIALIZE function sends the MPEG files of INITIAL OVERLAY SEQUENCE to the settop 20, and then calls the HILIGHT function of the BRANCH object that is pointed to by INITIAL FOCUS. INITIALIZE then sends the text elements from the TEXT objects pointed to by INITIAL TEXT, and finally copies INITIAL FOCUS to FOCUS to establish the current branch focus.

The function FIND_BRANCH is used as part of one means of navigation. When a keystroke identifier is received that corresponds to a response code, FIND_BRANCH is called with the received response code as an argument. FIND_BRANCH searches through the BRANCH objects to find the one having a response code matching the received response code. When it finds a match, it unhighlights the current focus, changes the focus to the BRANCH object having the matching response code, and then highlights the new focus. The search performed by FIND_BRANCH is a tree search, and any of several conventional search algorithms may be employed. If no matching response code is found, the focus is not changed.

The BRANCH objects identify each selectable button in a NODE object and their navigational interrelationships, and also contain navigation functions to enable a user to navigate the dialog menu represented by the NODE object. The data and functions of BRANCH objects are shown in BRANCH object 124 and are as follows:

HILIGHT DISPLAY OBJECT points to a DISPLAY OBJECT having the button corresponding to this BRANCH OBJECT highlighted. Similarly, UNHILIGHT DISPLAY OBJECT points to a DISPLAY OBJECT having the button corresponding to this BRANCH OBJECT Unhighlighted. In the preferred embodiment, each of these DISPLAY OBJECTS is pointing to a corresponding P-frame that describes only the highlighting or unhighlighting of the button, for example the above-mentioned files PH_IMAGE3 and PU_IMAGE3 respectively.

UP_BRANCH, DOWN_BRANCH, LEFT_BRANCH, AND RIGHT_BRANCH each point to corresponding BRANCH objects that are adjacent to this BRANCH object in the corresponding direction. These pointers control how the BRANCH focus is changed when an "arrow" key is pressed on the remote controller 22. These data elements may be programmed with null values if there is no corresponding BRANCH object, i.e., if the BRANCH object containing them is near an edge of the dialog image. Alternatively, these pointers may also be programmed to "wrap around" the screen, so that for example the LEFT_BRANCH pointer for a leftmost BRANCH object on an image would point to the BRANCH object at the far right of the image.

Finally, DESTINATION NODE points to another NODE object to be displayed if the "select" key on the remote controller 22 is pressed. If there is no such NODE object, then DESTINATION NODE contains a null value.

The above-described BRANCH data elements are used by BRANCH's various functions to navigate the menu and display the changing branch focus to the user. The HILIGHT function sends to the settop 18 the MPEG files of a DISPLAY object having the button associated with the BRANCH object highlighted. If an associated TEXT object exists, it also sends that. Similarly, the UNHILIGHT function sends to the settop 18 the MPEG files of a DISPLAY object having the button associated with the BRANCH object unhighlighted, and also removes any TEXT objects that were previously overlaid by HILIGHT.

The APPLICATION_CALL function is invoked when a branch object is selected and there is no destination node, i.e., when DESTINATION NODE contains a null value. APPLICATION_CALL in turn invokes an application program, such as video-on-demand, exit/quit, etc., that is associated with the selected control object. Navigation terminates when APPLICATION_CALL is invoked.

The UP ARROW, DOWN ARROW, LEFT ARROW, and RIGHT ARROW functions carry out navigation. Each one first calls the UNHILIGHT of the current BRANCH OBJECT, and then changes the NODE's FOCUS to the corresponding BRANCH, e.g., the BRANCH that is navigationally above, below, to the left or to the right of the current BRANCH. If there is no BRANCH in the indicated direction, then the current FOCUS is maintained. Then HILIGHT of the new FOCUS is called.

The SELECT function is called when the "select" button on the remote controller 22 is pressed. SELECT invokes the NODE object pointed to by DESTINATION NODE by calling its INITIALIZE function.

The DISPLAY objects contain data elements that identify associated MPEG files to be displayed for a NODE or BRANCH, associated TEXT objects, and linkage pointers to other DISPLAY objects. The data elements of DISPLAY objects are shown in DISPLAY object 130 and are as follows:

ID is the above-referred-to unique ID that is created for each MPEG file.

BITMAP FILE NAME identifies the bitmap file that is the source for the image to be displayed, for example IMAGE2. MPEG FILE NAME identifies the MPEG file (either I-frame or P-frame) that is to be transmitted. Examples are the files I_IMAGE1, P_IMAGE2, PH_IMAGEi, etc. PREVIOUS DISPLAY OBJECT and NEXT DISPLAY OBJECT are pointers linking this DISPLAY object to its neighbors in an MPEG frame sequence used to build up the overall image. TEXT OBJECT points to a text object having any text required for the display.

The TEXT objects contain data elements that describe text to be overlaid on an image. The data elements of TEXT objects are shown in TEXT object 132 and are as follows:

TEXT STRING is the text string to be displayed. X COORDINATE and Y COORDINATE describe the placement of the text on the screen. COLOR, SIZE and FONT respectively indicate the color, size and font with which the text should be displayed. NEXT TEXT OBJECT is a pointer to a subsequent TEXT OBJECT in an ordered list of TEXT OBJECTs.

While the foregoing has described two particular means of navigating around the menu, namely (1) by employing linked BRANCH objects and ARROW functions corresponding to arrow keys, and (2) using response codes and branch searching, the database of FIG. 8 may also be used with suitable modification in other navigational schemes. For example, if the user's TV system employs a cursor, a CURSOR_MAP function can be included to map the cursor location to the nearest BRANCH object, which then becomes FOCUS. The CURSOR_MAP function would be located in the NODE object, and would be invoked each time there was a change in the cursor position. A given system could support either cursor navigation, or arrow navigation, or both, and the implementation of the dialog database 48 may change depending on the support provided. For example, if the database need only support cursor navigation, then the various ARROW functions and BRANCH data elements in the BRANCH objects would be unnecessary.

It will be appreciated by those skilled in the relevant art that while the database structure shown in FIG. 8 is particularly suitable for use with the P-frame/I-frame methods of the current invention, it may also be used with other transmission and display schemes. For example, it may be used in a system that re-transmits the entire screen each time the image changes, rather than sending P-frames. In such a system, the linkages between DISPLAY objects would be unnecessary; however, the remaining features would still be of valuable use. Accordingly, the database of FIG. 8 embodies additional aspects of the present invention that have independent merit.

In a similar vein, there are other database implementations that will support the I-frame/P-frame display technique described herein. These may include object-oriented databases having different class structures, or relational databases, as well as more traditional structures. All such embodiments are intended to be described by the claims appended hereto.

What is claimed is:

1. A method of operating a computer, comprising the steps of:

instantiating application programs each being associated with a corresponding one of control objects appearing on a dialog video image to be subsequently displayed on a display device coupled to a communications medium connected to said computer;

transmitting over said communications medium a sequence of at least one compressed video frame collectively representing an unhighlighted version of said dialog video image, the transmitted video frames being encoded according to a compression algorithm that is capable of describing a single image by an independent video frame and also capable of describing the differences between a pair of images by a change video frame;

transmitting over said communications medium a change video frame representing changes to be made to said unhighlighted dialog video image in order to highlight an initial one of the control objects appearing thereon;

awaiting the receipt of a keystroke identifier from said communications medium;

executing the following navigation steps if the received keystroke identifier represents one of a set of navigation commands to be carried out by said computer:

(i) transmitting over said communications medium a change frame representing changes to the displayed dialog image that are necessary to unhighlight the control object that is currently highlighted;

(ii) selecting another of said control objects for highlighting as directed by said one navigation command; and (iii) transmitting over said communications medium a change frame representing changes to said dialog image that are necessary to highlight the selected control object; and invoking the application program associated with the currently-highlighted control object if said keystroke identifier represents a select command to be carried out by said computer.

2. A method according to claim 1, wherein said compression algorithm is the Motion Picture Expert Group (MPEG) algorithm, and wherein said independent video frame is an MPEG I-free and said change video frame is an MPEG P-frame.

3. A method according to claim 1, further comprising the steps of:
creating a text block to appear on said dialog video image, said text block including a text string and having descriptive text attributes associated therewith;
storing said text string and said descriptive text attributes on said computer; and
transmitting said text string and said descriptive text attributes over said communications medium to enable said video display device to reconstruct said text block for subsequent display thereon.

4. A method according to claim 1, wherein said dialog video image is a parent dialog video image having associated therewith a child dialog video image to appear when a corresponding control object on said parent dialog video image is activated, and further comprising the step of:
repeating the steps of claim 1 for said child video image upon activation of the corresponding control object on said parent dialog video image.

5. A method according to claim 1, further comprising the steps of:
composing said unhighlighted dialog video image on an authoring station coupled to said computer;
composing a set of highlighted dialog video images on said authoring station, each highlighted image resulting from corresponding changes to said unhighlighted dialog video image that highlight a corresponding one of said control objects;
encoding said composed images according to said compression algorithm to yield said sequence of at least one compressed video frame representing said unhighlighted dialog video image and all of said change video frames necessary to respectively highlight and unhighlight said control objects; and
storing the encoded video frames on said computer in a manner sufficient to preserve the sequentiality of said sequence of at least one compressed video frame and to preserve the association between each of said control objects and the corresponding pair of highlighting and unhighlighting change frames.

6. A method according to claim 1, wherein said set of navigation commands includes "up", "down", "left" and "right" navigation commands, and wherein the control object selected in said selecting step is the control object having the corresponding spatial relationship with the currently-highlighted control object.

7. A method according to claim 1, wherein:
(1) each of said control objects has associated therewith a corresponding one of a set of distinct predetermined response codes;
(2) said set of navigation commands comprises a command to select the control object whose response code matches a response code represented by the received keystroke identifier upon receipt thereof; and
(3) said selecting step comprises the steps of:
i) searching through said set of response codes to determine the control object whose corresponding response code matches the response code represented by the received keystroke identifier; and
ii) selecting the control object having the matching response code.

8. A method according to claim 1, further comprising the steps of:
1) instantiating a node object associated with said unhighlighted dialog video image and having the following attributes:
a) an initial frame pointer to point to a display object to be subsequently instantiated that is associated with said node object and also with said unhighlighted dialog video image;
b) a focus pointer to point to a selected one of branch objects to be subsequently instantiated that are associated with said node object and also respectively associated with corresponding ones of said control objects appearing on said dialog video image;
c) an initial focus data element to serve as the initial value of said focus pointer so that it initially points to an initial one of said branch objects that is associated with said initial control object; and
d) an initialize function to carry out said first transmitting step and the following steps upon execution:
i) obtaining from the display object pointed to by said initial frame pointer the names of video files stored on said computer that collectively contain said sequence of at least one compressed video frames in preparation for said first transmitting step;
ii) initializing said focus pointer with said initial focus data element; and
iii) carrying out said second transmitting step by executing a hilight function of the branch object pointed to by said initial focus data element;
2) instantiating said branch objects, each having the following attributes:
a) a hilight display object pointer to point to a hilight display object to be subsequently instantiated that is associated with the branch object being instantiated and also with a highlighted version of the control object associated therewith;
b) an unhilight display object pointer to point to an unhilight display object to be subsequently instantiated that is associated with the branch object being instantiated and also with an unhighlighted version of the control object associated therewith;
c) a hilight function to carry out the step of transmitting a change video frame to highlight the corresponding control object and also the following step upon execution:
i) obtaining from said hilight display object the name of a video file stored on said computer that contains the highlighting change video frame to be transmitted;
d) an unhilight function to carry out the step of transmitting a change video frame to unhighlight the corresponding control object and also the following step upon execution:
i) obtaining from said unhilight display object the name of a video file stored on said computer that contains the unhighlighting change video frame to be transmitted; and
e) a select function to invoke upon execution the one of said application programs that is associated with both the branch object being instantiated and the corresponding control object appearing on said dialog video image;
3) incorporating navigational attributes among said node object and said branch objects upon instantiation thereof, said navigational attributes including at least one navigation function to carry out said navigation steps by executing the following steps upon execution:

executing said unhilight function of the branch object pointed to by said focus pointer;

changing said focus pointer to point to a different one of said branch objects as directed by the navigation command represented by the received keystroke identifier; and executing said hilight function of the branch object pointed to by said focus pointer after it has been changed;

4) instantiating all of said display objects associated with said node object and branch objects, each display object also being associated with a corresponding one of said independent and change video frames and having the following attribute:

a) a name of an associated video file containing the corresponding one of said independent and change video frames;

5) carrying out said first and second transmitting steps by executing said initialize function of said node object;

6) carrying out said navigation steps by executing said navigation function upon receipt of a keystroke identifier representing one of said set of navigation commands; and 7) carrying out said invoking step by executing the select function of the branch object pointed to by said focus pointer upon receipt of a keystroke identifier representing said select command.

9. A method according to claim 8, wherein said navigational attributes comprise:

(1) up, down, left, and right branch pointers in each of said branch objects to point respectively to corresponding up, down, left, and right ones of said branch objects that are correspondingly spatially related to the branch object containing the corresponding branch pointer;

(2) up, down, left, and right arrow functions in each of said branch objects to respectively carry out the following steps upon execution:

i) executing the unhilight function of the branch object containing the arrow functions;

ii) substituting the corresponding one of said up, down, left, and right branch pointers for said focus pointer; and iii) executing the hilight function of the branch object pointed to by said focus pointer after said substituting step has been executed;

and wherein said step of executing said navigation function comprises the step of executing the corresponding one of said up, down, left and right functions of the branch object pointed to by said focus pointer if the received keystroke identifier represents a corresponding one of "up", "down", "left" and "right" navigation commands.

10. A method according to claim 8, wherein said navigational attributes comprise:

(1) a set of distinct predetermined response codes each contained in a corresponding one of said branch objects; and (2) a find_branch function in said node object to carry out the following steps upon execution:

i) searching through the response codes contained in said branch objects to determine the branch object whose response code matches a response code received from said communications medium;

ii) executing the unhilight function of the branch object having the matching response code;

iii) changing said focus pointer to points to the branch object having the matching response code; and iv) executing the hilight function of the branch object pointed to by said focus pointer after said changing step has been executed;

and wherein said step of executing said navigation function comprises the step of executing said find_branch function if the received keystroke identifier represents a response code.

11. A method of operating a computer, comprising the steps of:

1) instantiating application programs each being associated with a corresponding one of control objects appearing on a dialog video image to be subsequently displayed on a display device coupled to a communications medium connected to said computer;

2) instantiating a node object associated with said dialog video image and having the following attributes:

a) an initial frame pointer to point to a display object to be subsequently instantiated that is associated with said node object and also with said dialog video image;

b) a focus pointer to point to a selected one of branch objects to be subsequently instantiated that are associated with said node object and respectively associated with corresponding ones of said control objects;

c) an initial focus data element to serve as the initial value of said focus pointer; and d) an initialize function to carry out the following steps upon execution:

i) transmitting over a communications medium connected to said computer a set of at least one video files stored on said computer whose file name is contained within the display object pointed to by said initial frame pointer, said set of video files representing an unhighlighted version of said dialog video image;

ii) initializing said focus pointer with said initial focus data element; and iii) executing a hilight function of an initial branch object pointed to by said initial focus data element in order to highlight a corresponding initial control object;

3) instantiating said branch objects, each having the following attributes:

a) a hilight display object pointer to point to a hilight display object to be subsequently instantiated that is associated with the branch object being instantiated and with the corresponding control object;

b) an unhilight display object pointer to point to a unhilight display object to be subsequently instantiated that is associated with the branch object being instantiated and with the corresponding control object;

c) a hilight function to carry out the following steps upon execution:

i) transmitting over said communications medium a video file stored on said computer whose file name is contained within said hilight display object, the transmitted video file representing a corresponding version of said dialog video image in which the control object associated with the branch object being instantiated is highlighted;

d) an unhilight function to carry out the following steps upon execution:

i) transmitting over said communications medium a video file stored on said computer whose file name is contained within said unhilight display object, the transmitted video file representing a corresponding version of said dialog video image in which the control object associated with the branch object being instantiated is unhighlighted; and e) a select function to invoke upon execution the one of said application programs that is associated with both the branch object being instantiated and the corresponding control object appearing on said dialog video image;

4) incorporating navigational attributes among said node object and said branch objects upon instantiation thereof, said navigational attributes including at least one navigation function to carry out the following steps upon execution:

executing said unhilight function of the branch object pointed to by said focus pointer;

changing said focus pointer to point to a different one of said branch objects as directed by the one of a set of navigation commands that is represented by a keystroke identifier whose receipt from said communications medium has resulted in the execution of the navigation function; and executing said hilight function of the branch object pointed to by said focus pointer after it has been changed;

5) instantiating all of said display objects associated with said node object and branch objects, each display object having the following attributes:

a) a video file name of an associated video file stored on said computer associated with a corresponding one of said unhighlighted and highlighted versions of said dialog video image;

6) executing said initialize function of said node object;

7) awaiting the receipt of a keystroke identifier from said communications medium;

8) executing said navigation function upon receipt of a keystroke identifier representing one of said set of navigation commands; and 9) executing the select function of the branch object pointed to by said focus pointer upon receipt of a keystroke identifier representing said select command.

12. A method according to claim 11, wherein:

(1) said node object has an initial text pointer to point to a text object to be subsequently instantiated that is associated with said node object;

(2) said initialize function carries out upon execution the step of transmitting over said communications medium all of the data elements contained in the text object pointed to by said initial text pointer;

(3) said hilight function carries out upon execution the step of transmitting over said communications medium all of the data elements contained in another text object to be pointed to upon its subsequent instantiation by a text pointer contained within said hilight display object;

(4) said unhilight function carries out upon execution the step of transmitting over said communications medium a text string consisting of character blanks to be used to erase any text associated with said branch object that was displayed as a result of executing said hilight function; and (5) each of said display objects has a text pointer to point to a text object to be subsequently instantiated that is associated therewith;

and further comprising the step of:

instantiating all of said text objects associated with said node object and display objects, each text object having the following attributes:

a) a text string associated with the text object being instantiated; and b) X and Y coordinates to respectively indicate horizontal and vertical components of a screen position where said text string is to be displayed.

13. A method according to claim 12, wherein each of said text objects also contains a color value to indicate a color in which said text string is to be displayed.

14. A method according to claim 12, wherein each of said text objects also contains a font value to indicate a font in which said text string is to be displayed.

15. A method according to claim 12, wherein each of said text objects also contains a size value to indicate a size in which said text string is to be displayed.

16. A method according to claim 11, wherein said video files are encoded according to a video compression algorithm.

17. A method according to claim 11, wherein:

(1) said video files are encoded according to a compression algorithm that is capable of describing a single image by an independent video frame and also capable of describing the differences between a pair of images by a change video frame;

(2) said node object contains an initial overlay sequence pointer to point to ah ordered list of at least one display objects each of which contains the name of a corresponding one of said set of video files representing an unhighlighted version of said dialog video image;

(3) each of said display objects contains a previous display object pointer to point to an immediately-preceding display object in a corresponding sequence thereof; and (4) each of said display objects contains a next display object pointer to point to an immediately-following display object in said corresponding sequence of display objects;

the previous and next object display object pointers of said ordered list of display objects serving as the means by which it is ordered.

18. A method according to claim 11, wherein said compression algorithm is the Motion Picture Expert Group (MPEG) algorithm, and wherein said independent video frame is an MPEG I-frame and said change video frame is an MPEG P-frame.

19. A method according to claim 11, wherein:

(1) said dialog video image is a parent dialog video image having associated therewith at least one child dialog video images each to appear when a corresponding one of said control objects is activated;

(2) said node object is a parent node object associated with said parent dialog video image;

(3) each of said branch objects has a destination node pointer, the destination node pointer in each of those branch objects that is associated with a corresponding child dialog video image pointing to a corresponding associated child node object to be subsequently instantiated having the same attributes as said parent node object, the destination node pointer in the remainder of said branch objects containing a null value;

(4) said select function contains an application_call function that invokes the corresponding application program upon execution; and (5) said select function upon execution selects the child node object pointed to by said destination node pointer by executing the initialize function thereof if said destination node pointer does not contain said null value, and otherwise executes said application_call function;

and further comprising the steps of:

(1) repeating steps (1) through (5) of claim 11 for each of said child dialog video images prior to executing step (6) thereof; and (2) repeating steps (7) through (9) of claim 11 for each of said child node objects that is selected by the execution of the corresponding select function in said parent node object.

20. A method according to claim 11, wherein said navigational attributes comprise:

(1) up, down, left, and right branch pointers in each of said branch objects to point respectively to corresponding up, down, left, and right ones of said branch objects that are correspondingly spatially related to the branch object containing the corresponding branch pointer; (2) up, down, left, and right arrow functions in each of said branch objects to respectively carry out the following steps upon execution:

i) executing the unhilight function of the branch object containing the arrow functions;

ii) substituting the corresponding one of said up, down, left, and right branch pointers for said focus pointer; and iii) executing the hilight function of the branch object pointed to by said focus pointer after said substituting step has been executed;

and wherein said step of executing said navigation function comprises the step of executing the corresponding one of said up, down, left and right functions of the branch object pointed to by said focus pointer if the received keystroke identifier represents a corresponding one of "up", "down", "left" and "right" navigation commands.

21. A method according to claim 11, wherein said navigational attributes comprise:

(1) a set of distinct predetermined response codes each contained in a corresponding one of said branch objects; and (2) a find_branch function in said node object to carry out the following steps upon execution:

i) searching through the response codes contained in said branch objects to determine the branch object whose response code matches a response code received from said communications medium;

ii) executing the unhilight function of the branch object having the matching response code;

iii) changing said focus pointer to points to the branch object having the matching response code; and iv) executing the hilight function of the branch object pointed to by said focus pointer after said changing step has been executed;

and wherein said step of executing said navigation function comprises the step of executing said find_branch function if the received keystroke identifier represents a response code.

22. A method of operating a computer, comprising the steps of:

1) instantiating application programs each being associated with a corresponding one of control objects appearing on a dialog video image to be subsequently displayed on a display device coupled to a communications medium connected to said computer;

2) instantiating a node object associated with said dialog video image and having the following attributes:

a) an initial overlay sequence pointer to point to an ordered list of display objects to be subsequently instantiated that are associated with said node object and also with said dialog video image;

b) an initial text pointer to point to a text object to be subsequently instantiated that is associated with said node object and also with said dialog video image;

c) a focus pointer to point to a selected one of branch objects to be subsequently instantiated that are associated with said node object and respectively associated with corresponding ones of said control objects;

d) an initial focus data element to serve as the initial value of said focus pointer;

e) an initialize function to carry out the following steps upon execution:

i) sequentially transmitting over a communications medium connected to said computer a set of Motion Picture Expert Group (MPEG) files stored on said computer whose respective file names are contained within corresponding ones of the ordered list of display objects pointed to by said initial overlay sequence pointer, said set of MPEG files representing an unhighlighted version of said dialog video image;

ii) executing a hilight function of an initial one of said branch objects pointed to by said initial focus data element;

iii) transmitting over said communications medium all of the data elements contained in the text object pointed to by said initial text pointer; and iv) initializing said focus pointer with said initial focus data element; and f) a find_branch function to carry out the following steps upon execution:

i) comparing a response code received from said communications medium with each of distinct predetermined response codes, each of said predetermined response codes being contained in a corresponding one of said branch objects;

ii) executing an unhilight function contained in the branch object whose response code matches the received response code;

iii) changing said focus pointer so that it points to the branch object containing the matching response code; and iv) executing a hilight function of the branch object pointed to by said focus pointer after said changing step has been executed;

3) instantiating said branch objects, each having the following attributes:

a) a hilight display object pointer to point to a hilight display object to be subsequently instantiated that is associated with the branch object being instantiated and with the corresponding control object;

b) an unhilight display object pointer to point to a unhilight display object to be subsequently instantiated that is associated with the branch object being instantiated and with the corresponding control object;

c) a response code to be used by said find_branch function;

d) up, down, left, and right branch pointers to point respectively to corresponding up, down, left, and right ones of said branch objects that are correspondingly spatially related to the branch object being instantiated;

e) a destination node pointer to point to a child node object to be subsequently instantiated if its activation is intended to result from activation of the branch object being instantiated, and to otherwise contain a null value;

f) a hilight function to carry out the following steps upon execution:
  i) transmitting over said communications medium an MPEG file stored on said computer whose file name is contained within said hilight display object, the transmitted MPEG file representing a corresponding version of said dialog video image in which the control object associated with the branch object being instantiated is highlighted; and
  ii) transmitting over said communications medium all of the data elements contained in a text object to be pointed to upon its subsequent instantiation by a text pointer contained within said hilight display object;

g) an unhilight function to carry out the following steps upon execution:
  i) transmitting over said communications medium an MPEG file stored on said computer whose file name is contained within said unhilight display object, the transmitted MPEG file representing a corresponding version of said dialog video image in which the control object associated with the branch object being instantiated is unhighlighted; and
  ii) transmitting over said communications medium a text string consisting of character blanks to be used to erase any text associated with said branch object that was displayed as a result of executing said hilight function;

h) an application_call function to call upon execution one of said application programs that is associated with the branch object being instantiated;

i) a select function to carry out the following steps upon execution:
  i) executing the initialize function of the child node object pointed to by said destination pointer if said destination pointer does not contain said null value; and
  ii) executing said application_call function if said destination pointer contains said null value;

j) up, down, left, and right arrow functions to respectively carry out the following steps upon execution:
  i) executing the unhilight function of the branch object being instantiated;
  ii) changing the value of said focus pointer of said node object to the value of the corresponding one of said up, down, left, and right branch pointers; and
  iii) executing the hilight function of the branch object pointed to by said focus pointer after said changing step has been executed;

4) instantiating all of said display objects associated with said node object and branch objects, each display object having the following attributes:
  a) a Motion Picture Experts Group (MPEG) file name of an associated MPEG-format file associated with a corresponding one of said unhighlighted and highlighted versions of said dialog video image;
  b) a previous display object pointer to point to a display object immediately preceding the display object being instantiated in a sequence of display objects;
  c) a next display object pointer to point to a display object immediately following the display object being instantiated in said sequence of display objects; and
  d) a text pointer to point to a text object to be subsequently instantiated that is associated with the display object being instantiated;

5) instantiating all of said text objects associated with said node object and display objects, each text object having the following attributes:
  a) a text string associated with the text object being instantiated;
  b) a color value to indicate a color in which said text string is to be displayed;
  c) X and Y coordinates to respectively indicate horizontal and vertical components of a screen position where said text string is to be displayed;
  d) a font value to indicate a font in which said text string is to be displayed; and
  e) a size value to indicate a size in which said text string is to be displayed;

6) executing said initialize function of said node object;

7) awaiting the receipt of a keystroke identifier from said communications medium;

8) executing the select function of the branch object pointed to by said focus pointer if said keystroke identifier indicates that a "select" key has been pressed;

9) executing the corresponding one of said up, down, left and right functions of the branch object pointed to by said focus pointer if said keystroke identifier indicates that a corresponding one of "up", "down", "left" and "right" keys has been pressed;

10) executing said find_branch function if said keystroke identifier is a response code; and 11) repeating the preceding four steps until the receipt of a keystroke identifier results in the execution of the application_call function in one of said branch objects.

* * * * *